United States Patent
Chen et al.

(10) Patent No.: US 12,433,260 B1
(45) Date of Patent: Oct. 7, 2025

(54) METHOD FOR DETERMINING ECOLOGICAL FLOW PROCESS AND WATER TEMPERATURE PROCESS OF HABITAT REQUIREMENTS OF FULL LIFE HISTORY OF FISH

(71) Applicant: NANJING HYDRAULIC RESEARCH INSTITUTE, Jiangsu (CN)

(72) Inventors: Qiuwen Chen, Jiangsu (CN); Jianyun Zhang, Jiangsu (CN); Yuqing Lin, Jiangsu (CN); Tiesheng Guan, Jiangsu (CN); Ruxia Qiao, Jiangsu (CN)

(73) Assignee: NANJING HYDRAULIC RESEARCH INSTITUTE, Jiangsu (CN)

( * ) Notice: Subject to any disclaimer, the term of this patent is extended or adjusted under 35 U.S.C. 154(b) by 0 days.

(21) Appl. No.: 19/062,053

(22) Filed: Feb. 25, 2025

(30) Foreign Application Priority Data

Apr. 1, 2024 (CN) .......................... 202410382010.X (51) Int. Cl.
*A01K 61/10* (2017.01)
*A01K 61/95* (2017.01)
(52) U.S. Cl.
CPC .............. *A01K 61/10* (2017.01); *A01K 61/95* (2017.01)

(58) Field of Classification Search
CPC ................................ A01K 61/10; A01K 61/95
See application file for complete search history.

(56) References Cited

PUBLICATIONS

Burt et al. "The Importance of Parentage in Assessing Temperature Effects on Fish Early Life History: A Review of the Experimental Literature" (2011) Rev. Fish Biol. Fisheries, vol. 21, pp. 377-406 (Year: 2011).*

* cited by examiner

*Primary Examiner* — Jerry Lin
(74) *Attorney, Agent, or Firm* — JCIPRNET (57) ABSTRACT

Disclosed is a method for determining an ecological flow process and a water temperature process of habitat requirements throughout a life history of fish, the method performs a two-factor crossover experiment with different water temperatures and flow velocities for fish in different life history stages, makes fitting according to experimental data to obtain curved surfaces of two-factor interaction relationship between fish in the different life history stages, water temperature, flow velocity, and obtains suitable water temperatures and flow velocities for fish in the different life history stages according to the curved surfaces of two-factor interaction relationship, and then determines ecological flow process and water temperature process of habitat requirements throughout a life history of the fish.

9 Claims, 4 Drawing Sheets

METHOD FOR DETERMINING ECOLOGICAL FLOW PROCESS AND WATER TEMPERATURE PROCESS OF HABITAT REQUIREMENTS OF FULL LIFE HISTORY OF FISH

CROSS-REFERENCE TO RELATED APPLICATION

This application claims the priority benefit of China application serial no. 202410382010.X, filed on Apr. 1, 2024. The entirety of the above-mentioned patent application is hereby incorporated by reference herein and made a part of this specification.

BACKGROUND

Technical Field

The present disclosure relates to calculation methods of ecological flow process and water temperature process, and particularly relates to a method for determining ecological flow process and water temperature process of habitat requirements throughout a life history of fish.

Description of Related Art

A life history of fish refers to an entire life process that an individual fish undergoes from a fertilized egg to an adult fish, and from birth to death, which is also known as a life cycle of fish. During the developmental of individual fish, structure and function of the fish evolve from simple to complex, which is a process of gradual adaptation of the fish to an environment. The life history of fish involves an embryonic incubation stage, juvenile stage, and adult stage. The embryonic incubation stage includes an embryonic stage and a larval stage. The embryonic stage starts from the fertilization of the fertilized egg to the hatching of an embryo, which usually takes 2-3 days. The larval stage lasts from the hatching of a larval to the beginning of consuming external food, which usually takes 6-7 days. Fish in the juvenile stage resemble adults in terms of morphology and function, and live in a same habitat as that of adult fish, but they are not yet sexually mature and are incapable of reproducing. The juvenile stage starts from the beginning of consuming external food to sexual maturity, which usually takes 3-4 months. In the juvenile stage, the fish uses the energy mainly for the development and maturation of a gonad, and for accumulating reserves for reproduction. The adult stage starts from the sexual maturity to death, which usually lasts for 2-3 years. The adult fish spawn under suitable habitat conditions (hydrology and water temperature).

The heterogeneity and stability of a river habitat are important factors affecting the life history characteristics of fish. Changes in the habitat are crucial for the life history characteristics of fish. Regarding the studies on fish response to habitat factors, traditional studies have focused on the impact of habitat changes on fish spawning behavior, with less attention paid to the impact on different life history stages, such as such as egg hatching and survival rate. Moreover, fish is poikilothermal vertebrate, and changes in water temperature have a significant impact on physiological activities of fish. Water temperature requirements accompany the entire life process of fish, from the formation of primordial germ cells, oocyte growth, oocyte maturation, initiation of spawning, development of fingerling, to fish growth. However, traditional studies have primarily focused on the impact of flow velocity or water temperature on fish. Combined impact of flow velocity and water temperature on fish, especially the impact on gonad development, remains unclear.

Dam construction in the river plays a critical role in ensuring water safety and providing clean energy, but inevitably have an impact on the ecological environment of river. Maintaining suitable ecological flow is one of the important measures for river ecological restoration. Existing studies have developed various ecological flow process and water temperature process derivation methods, including hydrological method, hydraulic method, habitat method, integrated method, and combined analysis method. Specifically, the hydrological method has been widely applied due to its simplicity and minimal data requirements. However, the ecological flow process and water temperature process based on the hydrological method cannot reflect hydrological and hydraulic requirements of target fish species, such as flow velocity, water depth, and water temperature, making it difficult to reflect differences in the ecological flow needs of fish across different life history stages. At present, no ecological flow process and water temperature process derivation method for a dammed river that considers habitat needs of target fish species throughout their life history is available.

SUMMARY

In view of the problems existing in the prior art, the present disclosure provides a method for determining ecological flow process and water temperature process of habitat requirements throughout a life history of fish.

In order to achieve the above objective, the present disclosure provides a method for determining ecological flow process and water temperature process of habitat requirements throughout a life history of fish, including the following steps:

(1) dividing a number of fish eggs with synchronized development in an embryonic stage into a plurality of groups, and carrying out a two-factor crossover experiment with different water temperatures and flow velocities on each of the groups in a first annular water tank to obtain a number of hatched fish eggs and a number of survived fish eggs in each of the groups after the crossover experiment;

(2) dividing a number of fish with synchronized development in an juvenile stage into a plurality of groups, with equal numbers of male fish and female fish in each of the groups, and carrying out a two-factor crossover experiment with different water temperatures and flow velocities on each of the groups in a second annular water tank to obtain relative expression levels of feminization genes and masculinization genes through comprehensive transcriptomics analysis after the crossover experiment;

(3) dividing a number of fish with synchronized development in an adult stage into a plurality of groups, with equal numbers of male fish and female fish in each of the groups, and carrying out a two-factor crossover experiment with different water temperatures and flow velocities on each of the groups in a third annular water tank to obtain spawning quantity of each of the groups after the crossover experiment;

(4) obtaining spawning quantities of fish at different water temperatures and flow velocities during a wild spawning season, as well as water temperatures and flow velocities at the time of spawning;

(5) calculating hatching rate and survival rate for each group of fish eggs based on the numbers of hatched fish eggs and survived fish eggs of each of the groups, and fitting to obtain a curved surface of two-factor interaction relationship between the water temperature, the flow velocity and the hatching rate, and a curved surface of two-factor interaction relationship between the water temperature, the flow velocity and the survival rate according to the hatching rates and survival rates of the plurality of groups, as well as water temperatures and flow velocities corresponding to the working conditions; obtaining water temperature range and flow velocity range for a first embryonic stage where the hatching rate reaches a preset range of hatching rate according to the curved surface of two-factor interaction relationship between the water temperature, the flow velocity and the hatching rate; obtaining water temperature range and flow velocity range for a second embryonic stage where the hatching rate reaches a preset range of survival rate according to the curved surface of two-factor interaction relationship between the water temperature, the flow velocity and the survival rate; identifying an overlapping part of the water temperature range for the first embryonic stage and the water temperature range for the second embryonic stage as a suitable water temperature range for the embryonic stage, and identifying an overlapping part of the flow velocity range for the first embryonic stage and the flow velocity range for the second embryonic stage as a suitable flow velocity range for the embryonic stage;

(6) calculating gonadal development level of female fish and gonadal development level of male fish in each of the groups according to the relative expression levels of feminization genes and masculinization genes of each of the groups, fitting to obtain a curved surface of two-factor interaction relationship between the water temperature, the flow velocity and the gonadal development level of female fish, and a curved surface of two-factor interaction relationship between the water temperature, the flow velocity and the gonadal development level of male fish according to the gonadal development levels and corresponding water temperature and flow velocity; obtaining water temperature range and flow velocity range for a first juvenile stage where the gonadal development level of female fish reaches a preset range of developmental level according to the curved surface of two-factor interaction relationship between the water temperature, the flow velocity and the gonadal development level of female fish; obtaining water temperature range and flow velocity range for a second juvenile stage where the gonadal development level of male fish reaches a preset range of developmental level according to the curved surface of two-factor interaction relationship between the water temperature, the flow velocity and the gonadal development level of male fish; identifying an overlapping part of the water temperature range for the first juvenile stage and the water temperature range for the second juvenile stage as a suitable water temperature range for the juvenile stage, and identifying an overlapping part of the flow velocity range for the first juvenile stage and the flow velocity range for the second juvenile stage as a suitable flow velocity range for the juvenile stage;

(7) obtaining a first dataset according to the spawning quantity of each of the groups and the corresponding water temperature and flow velocity after the two-factor crossover experiment; obtaining a second dataset according to a spawning quantity of wild fish and the corresponding water temperature and flow velocity; standardizing the first dataset and the second dataset; fitting a curved surface of two-factor interaction relationship between the water temperature, the flow velocity and the standardized spawning quantity according to the standardized spawning quantity and the corresponding water temperature and the flow velocity; and obtaining standardized water temperature range and flow velocity range where the standardized spawning quantity reaches a preset spawning quantity threshold according to the curved surface of two-factor interaction relationship between the water temperature, the flow velocity and the standardized spawning quantity as suitable water temperature and suitable flow velocity for the adult stage;

(8) obtaining upper and lower limits of ecological flow ranges for the embryonic, juvenile, and adult stages by multiplying upper and lower limits of the suitable flow velocity ranges for the embryonic, juvenile, and adult stages by a cross-sectional area of the target river, and summarizing the ecological flow ranges for the embryonic, juvenile, and adult stages to obtain the ecological flow process and the water temperature process throughout a life history of fish; and (9) summarizing the suitable water temperature ranges for the embryonic, juvenile, and adult stages to obtain the water temperature process throughout a life history of fish.

Further, a method to obtain relative expression levels of feminization genes and masculinization genes specifically includes:

collecting gonadal tissue samples from the fish, performing transcriptome sequencing on the gonadal tissue samples using a transcriptome sequencing tool to obtain gene sequence data; and taking gene data of the group with the working conditions closest to a real environmental state as a control group based on the conditions of a false discovery rate (FDR)≥0.05 and fold change (FC)≤2, determining all differentially expressed feminization genes and masculinization genes, and analyzing relative expression levels of differentially expressed feminization genes and masculinization genes of each of the groups relative to the control group.

Further, calculation methods for gonadal development levels of female fish and male fish are as follows:

performing statistics of a number of the differentially expressed feminization genes and a number of the differentially expressed masculinization genes; and calculating and obtaining the gonadal development levels of female fish and male fish are through the relative expression levels of feminization genes and masculinization genes according to the following formulae:

$$\text{Gonadal development level of female fish} = \frac{\sum \text{Relative expression level of feminization genes}}{\text{Number of the differentially expressed feminization genes}}$$

-continued $$\text{Gonadal development level of male fish} = \frac{\dfrac{\sum \text{Relative expression level of masculinization genes}}{\text{Number of the differentially expressed masculinization genes}}}{\dfrac{\sum \text{Relative expression level of masculinization genes}}{\text{Number of the differentially expressed masculinization genes}} - \dfrac{\sum \text{Relative expression level of feminization genes}}{\text{Number of the differentially expressed feminization genes}}}.$$

Further, the first annular water tank is composed of a first straight section, a first curved section, a second straight section, and a second curved section that are connected in sequence, booster pumps are installed on both sides of the straight section, and different flow velocities are achieved by controlling a number of the booster pumps to be turned on; and the first annular water tank is completely placed in a temperature-controlled room, such that different water temperature conditions can be achieved.

Further, the second annular water tank has a diameter greater than that of the first annular water tank; the second annular water tank is composed of a first straight section, a first curved section, a second straight section, and a second curved section that are connected in sequence; electric propellers are installed on both sides of the straight section, achieving working conditions of different flow velocities through different powers of the electric propellers; and the second annular water tank is covered with a translucent tarpaulin, a plurality of electric heating rods are placed inside the second annular water tank at intervals, and a cooling water circulating industrial chiller is also placed inside the second annular water tank to achieve working conditions of different water temperatures.

Further, the third annular water tank has a diameter greater than that of the second annular water tank, the third annular water tank is composed of a first triangular section, a first curved section, a second triangular section, and a second curved section that are connected in sequence; each of the first triangular section and the second triangular section is composed of a base and two hypotenuses located on the base, the base is connected to inner edges of the first curved section and the second curved section, the two hypotenuses are respectively connected to outer edges of the first curved section and second curved section, barrier nets and a plurality of thrusters are arranged in the first triangular section and the second triangular section, a plurality of submersible pumps are arranged inside the barrier nets, and different combinations of thrusters and submersible pumps can achieve working conditions of different flow velocities; and a plurality of electric heating tubes are placed at intervals inside each of the first curved section and the second curved section, and a water cooling device is also placed to achieve work conditions of different water temperatures.

Further, a setting method of the working conditions for the two-factor crossover experiment is as follows:
  selecting m water temperature point values at equal intervals from a survivable water temperature range for the fish, and selecting n flow velocity point values at equal intervals from a survivable flow velocity range for the fish; and
  selecting any point value from the m water temperature point values, selecting any point value from the n flow velocity point values, combining the point value in pair to obtain m×n different combinations, and taking each of the combinations as working conditions for one group of the fish.

Further, a sampling method for the wild spawning season is as follows:
  sampling fish eggs, flow velocity, and water temperature at a target cross section of a target river section during the spawning season continuously at regular intervals until no fish eggs can be found;
  obtaining flow velocity and water temperature at an upstream of the target cross section upon sampling;
  identifying a number of fish eggs, egg density and embryo development time of fish eggs;
  considering a location at a distance L (L=flow velocity at the target cross section×embryo development time) from an upstream direction to the target cross section as a fish spawning site;
  obtaining flow velocity and water temperature of the fish spawning site according to the flow velocity and water temperature at the upstream of the target cross section during sampling, and taking the same as flow velocity and water temperature of a spawning cross section; and
  determining spawning quantity at each moment at the spawning cross section according to the identified number of fish eggs.

Further, a method for obtaining a second dataset is as follows:
  considering a continuous time period during which spawning behavior occurs for more than 2 consecutive days as a spawning event according to the spawning quantity at the each moment at the spawning cross section;
  identifying a moment when spawning quantity of each spawning event increases by a preset percentage over a previous moment as a spawning peak event; and
  obtaining and identifying flow velocity and water temperature at a spawning cross section corresponding to a moment with a maximum egg density of each spawning peak event as the second dataset.

Further, the above curved surface of two-factor interaction relationship is fitted using Gaussian regression.

Compared with the prior art, the present disclosure has the beneficial effects:

(1) The present disclosure integrates the habitat requirements of fish throughout the life cycle: a method for determining ecological flow process and water temperature process of habitat requirements throughout a life history of fish in the dammed river is built in combination with different needs of the target fish at different life cycle stages for flow velocity and water temperature (embryo hatching, juvenile gonadal development, and adult spawning), such that fish habitat protection can be achieved by adopting corresponding coupling and regulation methods (for example, the high flow velocity promotes spawning, the low flow velocity improves hatching, and ecological flow facilitates alternating wet and dry periods) for the ecological flow and water temperature processes during different life history stages of fish.

(2) The present disclosure accurately determines optimal water temperature and ecological flow velocity through the cross-setting of water temperature and flow velocity: the present disclosure breaks through the conventional thinking of separately considering the impact of flow velocity and water temperature on fish spawning behavior, or simply superimposing flow velocity and water temperature, but gives comprehensive consideration to the combined influences of water temperature and flow velocity on fish, that is, a same flow velocity at different water temperatures may have different impacts on fish at different water temperatures, and a same water temperature at different flow velocities may have different impacts on fish. Based on the concept, the present disclosure sets up the water temperature and flow velocity parameters in a crossover manner during experiments, and the results obtained by solving the data from the crossover experiments are more accurate.

(3) The present disclosure provides different experimental devices for fish in different life history stages: consideration is given to the needs of fish in different life history stages, size, material, temperature control method, and flow velocity regulation system of the water tanks are designed based on the habitats simulation requirements of dammed river, and an experimental device is established to study the impacts of coupling effects of flow velocity and water temperature on reproduction of fish in different life stages, enriching the use of annular water tanks to simulate and control habitats in dammed river.

(4) Relative expression levels of sex-determining functional genes are taken as indicators of gonadal development: the present disclosure provides a molecular biological evaluation method to determine gonadal development using sex-determining functional genes, which is more accurate and eliminates the defects of low sensitivity and high subjectivity of traditional morphological evaluation.

DESCRIPTION OF THE EMBODIMENTS

The technical solutions of embodiments of the present invention will be described below clearly and comprehensively in conjunction with accompanying drawings of the embodiments of the present invention. Apparently, the embodiments described are merely some embodiments rather than all embodiments of the present invention. All other examples obtained by those of ordinary skill in the art on the basis of the examples of the present invention without creative efforts shall fall within the protection scope of the present invention.

Figure 1:
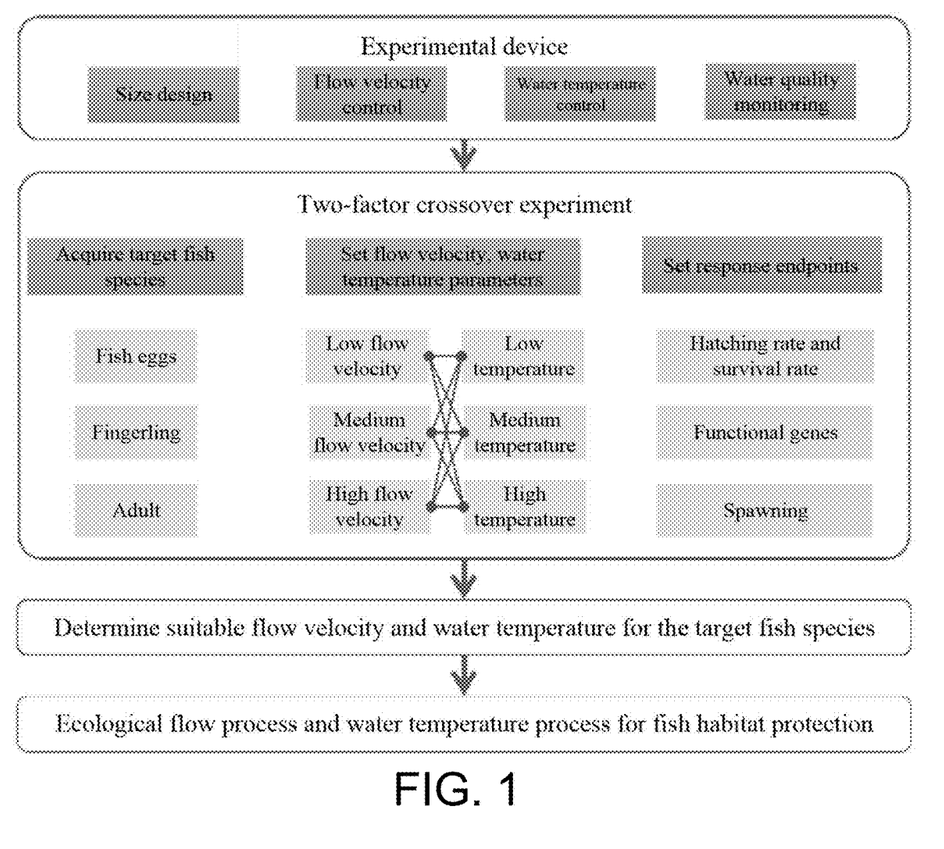
FIG. 1 is a schematic flow diagram of a method for determining ecological flow process and water temperature process of habitat requirements throughout a life history of fish according to an embodiment of the present disclosure.

The present disclosure provides a method for determining ecological flow process and water temperature process of habitat requirements throughout a life history of fish, as shown in FIG. 1, which includes the following steps:

S1. dividing a number of fish eggs with synchronized development in an embryonic stage into a plurality of groups, and carrying out a two-factor crossover experiment with different water temperatures and flow velocities on each of the groups in a first annular water tank to obtain a number of hatched fish eggs and a number of survived fish eggs in each of the groups after the crossover experiment.

Figure 2:
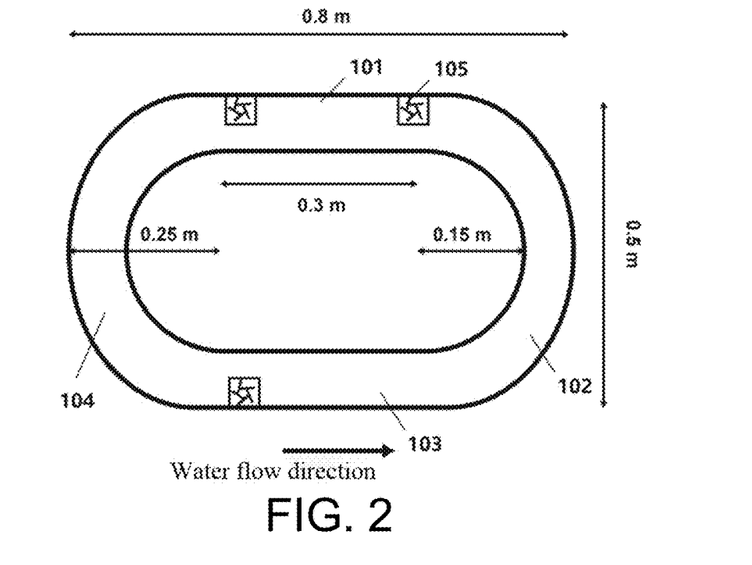
FIG. 2 is a structural schematic diagram of a first annular tank, an experimental device for fish eggs in an embryonic stage, according to an embodiment of the present disclosure.

Specifically, as shown in FIG. 2, the first annular water tank is composed of a first straight section 101, a first curved section 102, a second straight section 103, and a second curved section 104 that are connected in sequence, the curved section has an outer diameter of 0.5 m, and the straight section has length, width and height of 0.3 m, 0.1 m and 0.2 m, respectively; booster pumps 105 (85 W) are installed on both sides of the straight section, and the different flow velocities are achieved by controlling a number of the booster pumps 105 to be turned on; the first annular water tank is completely placed in a temperature-controlled room as a whole, such that different water temperature conditions can be achieved; and a temperature sensor is installed in the first annular water tank to monitor the water temperature.

In the present disclosure, working conditions of the water temperature and flow velocity for all of the groups are set in a crossover manner to cover combinations of the different temperatures and flow velocities. A specific setting method of the working conditions is as follows: m water temperature point values are selected at equal intervals from a survivable water temperature range for the fish, and n flow velocity point values are selected at equal intervals from a survivable flow velocity range for the fish; any point value is selected from the m water temperature point values, and any point value is selected from the n flow velocity point values, the point value are combined in pair to obtain m×n different combinations, each of the combinations is taken as working conditions for one group of the fish. For example, the working conditions can be a low temperature and low flow velocity group, a medium temperature and low flow velocity group, a high temperature and low flow velocity group, a low temperature and medium flow velocity group, a medium temperature and medium flow velocity group, a high temperature and medium flow velocity group, a low temperature and high flow velocity group, a medium temperature and high flow velocity group, and a high temperature and high flow velocity group. Each of the working conditions is provided with 3 parallel groups, the fish eggs are divided into 9 groups and 27 sub-groups in total, and 200 fertilized eggs are selected from each of the subgroups for evaluation. For the first annular water tank: (1) when one booster pump 105 is turned on, a designed maximum flow velocity in the tank reaches 0.4 m/s, corresponding to a low velocity; (2) when two booster pumps 105 are turned on, a designed maximum flow velocity in the tank reaches 0.8 m/s, corresponding to a medium velocity; and (3) when three booster pumps 105 are turned on, a designed maximum flow velocity in the tank reaches 1.2 m/s, corresponding to high velocity. The water temperature is adjusted by an indoor air conditioner, and can be set as needed. When the embryonic fish egg experiment is performed in the first annular water tank, a 3-day stress experiment is conducted with a constant water level, half of the water is changed each day, and water quality is consistent that in an acclimation pond.

S2. Dividing a number of fish with synchronized development in an juvenile stage into a plurality of groups, with equal numbers of male fish and female fish in each of the groups, and carrying out a two-factor crossover experiment with different water temperatures and flow velocities on each of the groups in a second annular water tank to obtain relative expression levels of feminization genes and masculinization genes through comprehensive transcriptomics analysis after the crossover experiment.

Figure 3:
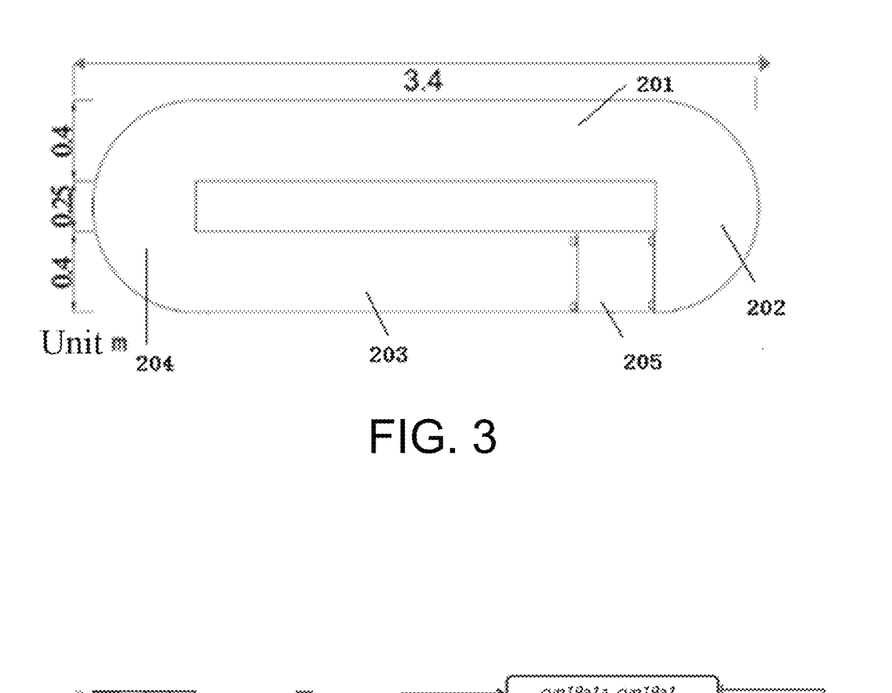
FIG. 3 is a structural schematic diagram of a second annular tank, an experimental device for fish in a juvenile stage, according to an embodiment of the present disclosure.

Specifically, as shown in FIG. 3, the second annular water tank has a diameter greater than that of the first annular water tank. The second annular water tank is composed of a first straight section 201, a first curved section 202, a second straight section 203, and a second curved section 204 that are connected in sequence, the curved section has an outer diameter of 1.05 m, and the straight section has length, width and height of 3.4 m, 0.4 m and 0.8 m, respectively; electric propellers 205 (850 W) are installed on both sides of the straight section as a source of driving force to drive the water flow, achieving working conditions of different flow velocities; the electric propellers 205 make low noise to avoid disturbing the fish; a plurality of electric heating rods (800 W, 5 rods per group) are placed inside the second annular water tank at intervals, a cooling water circulating industrial chiller is also placed inside, and the entire space is provided with an air conditioner to achieve working conditions of different water temperatures. A temperature alarm system (two per group) is used for real-time water temperature warning. In order to ensure that the temperature reaches a desired level, the water tank is covered with a translucent tarpaulin, and water quality is consistent that in the acclimation pond.

Before the experiment, juvenile fish are collected from a target dammed river, temporarily placed in a rearing pond for rearing, and then transferred to the second annular water tank after rearing. A 30-day stress experiment is conducted in the second annular water tank, with water sourced from the target dammed river to make an experimental environment as close to natural conditions as possible. Water quality parameters are measured using a multi-functional water quality analyzer. One-third of the water is replaced every five days, the fish are fed at 6 p.m. every day, the flow velocity is turned off for 2 hours, and the tank is cleaned at regular intervals to remove debris therein. Working conditions of the water temperature and flow velocity for all of the groups are set in a crossover manner, including: a low temperature and low flow velocity group, a medium temperature and low flow velocity group, a high temperature and low flow velocity group, a low temperature and medium flow velocity group, a medium temperature and medium flow velocity group, a high temperature and medium flow velocity group, a low temperature and high flow velocity group, a medium temperature and high flow velocity group, and a high temperature and high flow velocity group. Three parallel experiments are set for each of the groups.

Figure 4:
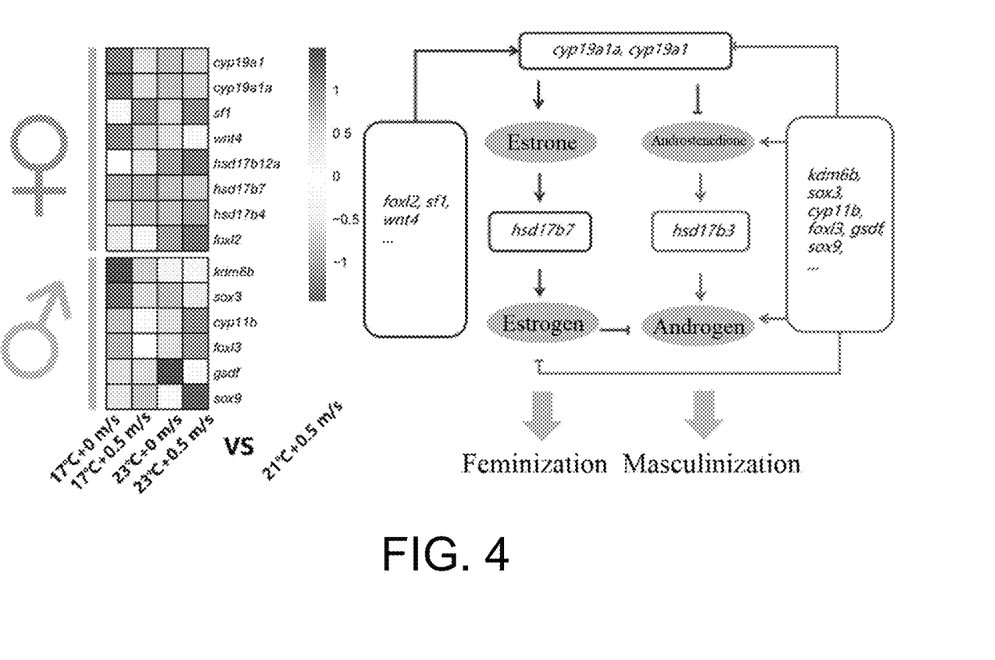
FIG. 4 is a diagram showing experimental results of transcriptome sequencing according to an embodiment of the present disclosure.

After the experiment, gonads of the juveniles are obtained for comprehensive analysis of histopathology and transcriptomics to obtain relative expression levels of feminization genes and masculinization genes. The specific method includes: collecting gonadal tissue samples from the fish, performing transcriptome sequencing on the gonadal tissue samples using a transcriptome sequencing tool (such as Illumina) to obtain gene sequence data; taking gene data of the group with the working conditions closest to a real environmental state as a control group based on the conditions of a false discovery rate (FDR)≥0.05 and fold change (FC)≤2, and determining all differentially expressed feminization genes and masculinization genes. The differentially expressed feminization genes include cyp19a1, cyp19a1a, sf1, wnt4, hsd17b12a, hsd17b8 and fox12, the differentially expressed masculinization genes include kdm6b, sox3, cyp11b, fox13, gsdf and sox9. The relative expression levels of differentially expressed feminization genes and masculinization genes of each of the groups relative to the control group are analyzed (FIG. 4).

S3. Dividing a number of fish with synchronized development in an adult stage into a plurality of groups, with equal numbers of male fish and female fish in each of the groups, and carrying out a two-factor crossover experiment with different water temperatures and flow velocities on each of the groups in a third annular water tank to obtain spawning quantity of each of the groups after the crossover experiment.

Figure 5:
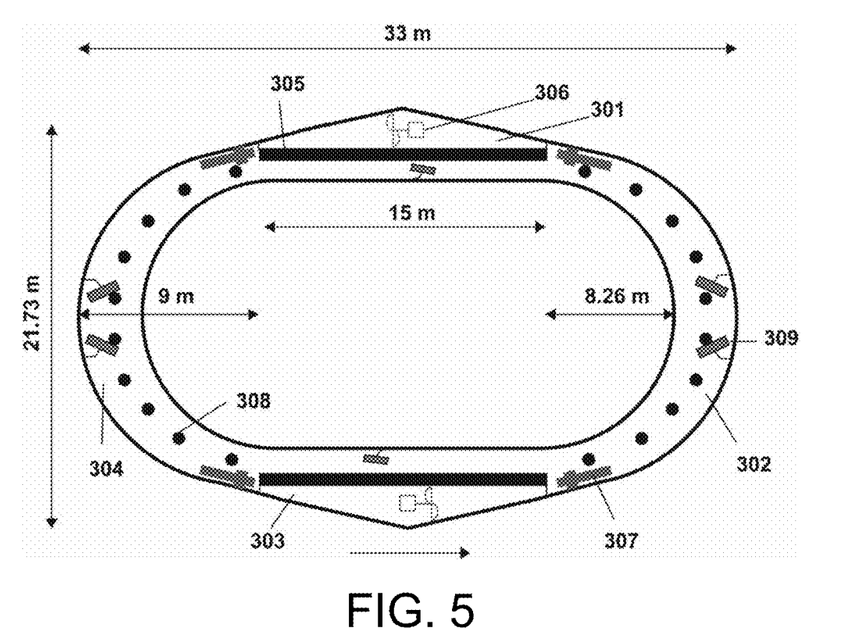
FIG. 5 is a structural schematic diagram of a third annular tank, an experimental device for fish in an adult stage, according to an embodiment of the present disclosure.

Specifically, as shown in FIG. 5, the third annular water tank has a diameter greater than that of the second annular water tank, the curved section has an outer diameter of 18 m, and the straight section has a length of 15 m, the water tank has outer circumference, inner circumference, width and height of 87.49 m, 81.90 m, 0.74 m and 1.70 m, respectively. The third annular water tank is composed of a first triangular section 301, a first curved section 302, a second triangular section 303, and a second curved section 304 that are connected in sequence; each of the first triangular section 301 and the second triangular section 303 is composed of a base and two hypotenuses located on the base, the base is connected to inner edges of the first curved section 302 and the second curved section 304, the two hypotenuses are respectively connected to outer edges of the first curved section 302 and second curved section 304, and the two hypotenuses form an obtuse angle. Barrier nets 305 and submersible pumps 307 (7.5 kW) are arranged in the first triangular section 301 and the second triangular section 303, a plurality of thrusters 306 (3 kW) are arranged inside the barrier net 305 to prevent experimental fish from entering the equipment and being scratched by the equipment. Different combinations of thrusters 306 and submersible pumps 307 can achieve working conditions of different flow velocities. A plurality of electric heating tubes 308 are placed at intervals inside each of the first curved section 302 and the second curved section 304, and a water cooling device (6 kW) is also placed to achieve work conditions of different flow velocities. A method to achieve work conditions of different flow velocities are as follows: (1) when one of the submersible pumps 307 is turned on, a designed maximum flow velocity in the tank reaches 0.8 m/s; (2) when two of the submersible pumps 307 are simultaneously turned on, a designed maximum flow velocity in the tank reaches 1.00 m/s; (3) when one of the submersible pumps 307 and two of the thrusters 306 are simultaneously turned on, a designed maximum flow velocity in the tank reaches 1.20 m/s; (4) when two of the submersible pumps 307 and two of the thrusters 306 are simultaneously turned on, a designed maximum flow velocity in the tank reaches 1.40 m/s; (5) when three of the submersible pumps 307 and two of the thrusters 306 are simultaneously turned on, a designed maximum flow velocity in the tank reaches 1.60 m/s; and (6) when four of the submersible pumps 307 and two of the thrusters 306 are simultaneously turned on, a designed maximum flow velocity in the tank reaches 1.80 m/s. 22 measuring points are arranged around the tank, and flow velocity at a depth of 0.5 m is measured using a flow meter.

Five underwater cameras 309 are arranged around the tank to observe the spawning behavior of the target fish.

Before the experiment, a plurality of mature male and female target fish are collected from a target dammed river and placed in net cages in an acclimation tank, and the fish are feed one commercial fish feed twice a day until the fish is full. After the acclimation, a pair of male and female fish is randomly selected as a group and is temporarily placed in a rearing tank for rearing, and after the rearing, the fish is transferred to the third annular tank. During the experiment, experimental water used in the third annular tank is sourced from the target dammed river, with a water depth of 0.9 m, so as to make an experimental environment as close to natural conditions as possible. Water quality parameters are measured using the multi-functional water quality analyzer. One-third of the water is replaced every five days, the fish are fed at 6 p.m. every day, the flow velocity is turned off for 2 hours, and the tank is cleaned at regular intervals to remove debris therein. Working conditions of the water temperature and flow velocity for all of the groups are set in a crossover manner, including: a low temperature and low flow velocity group, a medium temperature and low flow velocity group, a high temperature and low flow velocity group, a low temperature and medium flow velocity group, a medium temperature and medium flow velocity group, a high temperature and medium flow velocity group, a low temperature and high flow velocity group, a medium temperature and high flow velocity group, and a high temperature and high flow velocity group. Three parallel experiments are set for each of the groups. The experiment lasts for 3 days or until spawning occurs in each of the working conditions. The spawning quantity for each group of fish is recorded at different time points.

S4. Obtaining spawning quantities of fish at different water temperatures and flow velocities during a wild spawning season, as well as water temperatures and flow velocities at the time of spawning.

Specifically, a sampling method for the wild spawning season is as follows: fish eggs, flow velocity, and water temperature at a target cross section of a target river section during the spawning season, such as 8:00-9:00 and 14:00-15:00 every day, are continuously sampled at regular intervals, until no fish eggs can be found; flow velocity and water temperature at an upstream of the target cross section upon sampling are obtained; the collected fish eggs are checked immediately after the sampling, to identify a number of fish eggs from the target fish species and embryo development time, and unidentified fish eggs are incubated in a laboratory until species thereof can be determined; an egg density for each sampling is estimated; a location at a distance L (L=flow velocity at the target cross section×embryo development time) from an upstream direction to the target cross section is considered as a fish spawning site; according to the flow velocity and water temperature at the upstream of the target cross section during sampling, flow velocity and water temperature of the fish spawning site are obtained, which are taken as flow velocity and water temperature of a spawning cross section; and spawning quantity at each moment at the spawning cross section is then determined according to the identified number of fish eggs.

S5. Calculating hatching rate and survival rate for each group of fish eggs based on the numbers of hatched fish eggs and survived fish eggs of each of the groups, and fitting to obtain a curved surface of two-factor interaction relationship between the water temperature, the flow velocity and the hatching rate, and a curved surface of two-factor interaction relationship between the water temperature, the flow velocity and the survival rate according to the hatching rates and survival rates of the plurality of groups, as well as water temperatures and flow velocities corresponding to the working conditions; obtaining water temperature range and flow velocity range for a first embryonic stage where the hatching rate reaches a preset range of hatching rate according to the curved surface of two-factor interaction relationship between the water temperature, the flow velocity and the hatching rate; obtaining water temperature range and flow velocity range for a second embryonic stage where the hatching rate reaches a preset range of survival rate according to the curved surface of two-factor interaction relationship between the water temperature, the flow velocity and the survival rate; identifying an overlapping part of the water temperature range for the first embryonic stage and the water temperature range for the second embryonic stage as a suitable water temperature range for the embryonic stage, and identifying an overlapping part of the flow velocity range for the first embryonic stage and the flow velocity range for the second embryonic stage as a suitable flow velocity range for the embryonic stage.

Specifically, the preset range of hatching rate and the preset range of survival rate can be set according to hatching rate and survival rate of fish in natural environments, for example, 90%-100% of maximum hatching rate and survival rate are set as the preset ranges.

Figure 6:
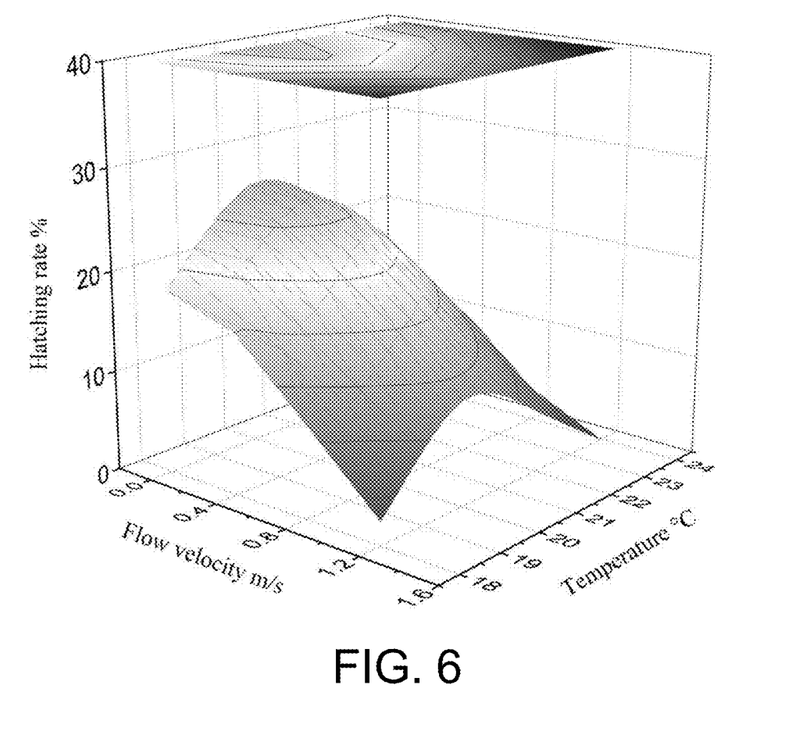
FIG. 6 is a diagram of a curved surface of two-factor interaction relationship between water temperature, flow velocity and hatching rate according to an embodiment of the present disclosure.

The curved surface of two-factor interaction relationship between the water temperature, the flow velocity and the hatching rate obtained from the experiment is shown in FIG. 6. It can be seen from the figure that the suitable flow velocity range for the embryonic stage is 0-0.4 m/s, and the suitable water temperature range for the embryonic stage is 20-22° C.

S6. Calculating gonadal development level of female fish and gonadal development level of male fish in each of the groups according to the relative expression levels of feminization genes and masculinization genes of each of the groups, fitting to obtain a curved surface of two-factor interaction relationship between the water temperature, the flow velocity and the gonadal development level of female fish, and a curved surface of two-factor interaction relationship between the water temperature, the flow velocity and the gonadal development level of male fish according to the gonadal development levels and corresponding water temperature and flow velocity; obtaining water temperature range and flow velocity range for a first juvenile stage where the gonadal development level of female fish reaches a preset range of developmental level according to the curved surface of two-factor interaction relationship between the water temperature, the flow velocity and the gonadal development level of female fish; obtaining water temperature range and flow velocity range for a second juvenile stage where the gonadal development level of male fish reaches a preset range of developmental level according to the curved surface of two-factor interaction relationship between the water temperature, the flow velocity and the gonadal development level of male fish; identifying an overlapping part of the water temperature range for the first juvenile stage and the water temperature range for the second juvenile stage as a suitable water temperature range for the juvenile stage, and identifying an overlapping part of the flow velocity range for the first juvenile stage and the flow velocity range for the second juvenile stage as a suitable flow velocity range for the juvenile stage.

Specifically, the preset ranges of developmental levels can be set according to the actual developmental levels of fish in a natural environment, for example, 90%-100% of maximum development levels in the natural environment are set as the preset ranges of developmental levels. Calculation methods for gonadal development levels of female fish and male fish are as follows: the differentially expressed feminization genes and the differentially expressed masculinization genes are statistically analyzed; and the gonadal development levels of female fish and male fish are calculated through the relative expression levels of feminization genes and masculinization genes according to the following formulae:

Gonadal development level of female fish =

$$\frac{\sum \text{Relative expression level of feminization genes}}{\text{Number of the differentially expressed feminization genes}} - \frac{\sum \text{Relative expression level of masculinization genes}}{\text{Number of the differentially expressed masculinization genes}}$$

Gonadal development level of male fish =

$$\frac{\sum \text{Relative expression level of masculinization genes}}{\text{Number of the differentially expressed masculinization genes}} - \frac{\sum \text{Relative expression level of feminization genes}}{\text{Number of the differentially expressed feminization genes}}$$

According to the experiment, the suitable flow velocity range for the juvenile is 0-0.5 m/s, and the suitable water temperature range is 17-21° C.

S7. Obtaining a first dataset according to the spawning quantity of each of the groups and the corresponding water temperature and flow velocity after the two-factor crossover experiment; obtaining a second dataset according to a spawning quantity of wild fish and the corresponding water temperature and flow velocity; standardizing the first dataset and the second dataset; fitting a curved surface of two-factor interaction relationship between the water temperature, the flow velocity and the standardized spawning quantity according to the standardized spawning quantity and the corresponding water temperature and the flow velocity; and obtaining standardized water temperature range and flow velocity range where the standardized spawning quantity reaches a preset spawning quantity threshold according to the curved surface of two-factor interaction relationship between the water temperature, the flow velocity and the standardized spawning quantity as suitable water temperature and suitable flow velocity for the adult stage.

Specifically, a method for obtaining a second dataset is as follows: a continuous time period during which spawning behavior occurs for more than 2 consecutive days is considered as a spawning event according to the spawning quantity at the each moment at the spawning cross section; a moment when spawning quantity of each spawning event increases by a preset percentage (such as 20%) over a previous moment is identified as a spawning peak event; and flow velocity and water temperature at a spawning cross section corresponding to a moment with a maximum egg density of each spawning peak event are identified as the second dataset.

A method for fitting a curved surface of two-factor interaction relationship between the water temperature, the flow velocity and the standardized spawning quantity is as follows: the first dataset and the second dataset are standardized, and a curved surface of two-factor interaction relationship between the water temperature, the flow velocity and the standardized spawning quantity is fitted and obtained according to the standardized spawning quantity and the corresponding water temperature and the flow velocity.

Figure 7:
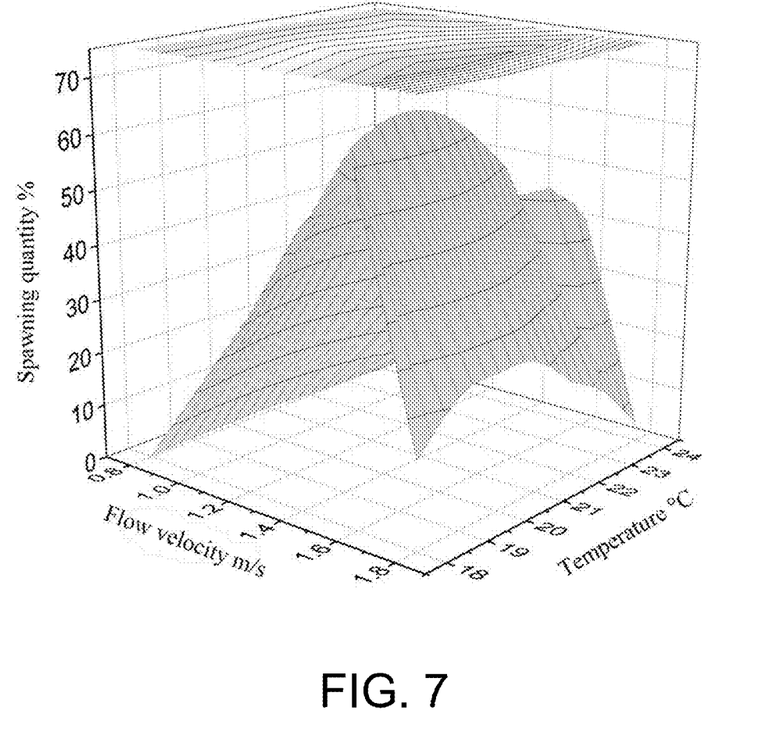
FIG. 7 is a diagram of a curved surface of two-factor interaction relationship between water temperature, flow velocity and spawning quantity according to an embodiment of the present disclosure.

The curved surface of two-factor interaction relationship between the water temperature, the flow velocity and the spawning quantity obtained from the experiment is shown in FIG. 7. It can be seen from the figure that the suitable flow velocity range for the adult stage is 1.00-1.60 m/s, and the suitable water temperature range for the adult stage is 20-22° C.

The above curved surface of two-factor interaction relationship is fitted using Gaussian regression, and more accurate relationship curves can be obtained.

S8. Obtaining upper and lower limits of ecological flow ranges for the embryonic, juvenile, and adult stages by multiplying upper and lower limits of the suitable flow velocity ranges for the embryonic, juvenile, and adult stages by a cross-sectional area of the target river, and summarizing the ecological flow ranges for the embryonic, juvenile, and adult stages to obtain the ecological flow process and the water temperature process throughout a life history of fish.

For example, the suitable flow velocity range for the adult stage is 1.00-1.60 m/s, with the upper and lower limits being 1.00 and 1.60, respectively, and then multiplies the values by the cross-sectional area (S in square meters) of the target river to obtain the ecological flow range of S-1.6 S m³/s.

S9. Summarizing the suitable water temperature ranges for the embryonic, juvenile, and adult stages to obtain the water temperature process throughout a life history of fish.

The summarized ecological flow process and water temperature process of habitat requirements throughout a life history of fish are shown in Table 1.

TABLE 1

Ecological flow process and water temperature process of habitat requirements of fish throughout life history

| Life history | Key physiological process | Suitable water temperature | Ecological flow |
|---|---|---|---|
| Embryonic stage | Fish egg hatching | 20-22° C. | 1.2 S-1.4 S m³/s |
| Juvenile stage | Gonadal development | 17-21° C. | 0-0.5 S m³/s |
| Adult stage | Spawning and reproduction | 20-22° C. | S-1.6 S m³/s |

By analyzing the ecological flow process and water temperature process of habitat requirements throughout a life history of fish, fish habitat protection can be achieved by adopting corresponding coupling and regulation methods for the ecological flow and water temperature processes during different life history stages of fish (for example, the high flow velocity promotes spawning, the low flow velocity improves hatching, and ecological flow facilitates alternating wet and dry periods).

What is claimed is:

1. A method for determining an ecological flow process and a water temperature process of habitat requirements throughout a life history of fish, comprising following steps:
   (1) dividing a number of fish eggs with synchronized development in an embryonic stage into a plurality of groups, and carrying out a two-factor crossover experiment with different water temperatures and flow velocities on each of the groups in a first annular water tank to obtain a number of hatched fish eggs and a number of survived fish eggs in each of the groups after the two-factor crossover experiment;

(2) dividing a number of fish with synchronized development in an juvenile stage into a plurality of groups, with equal numbers of male fish and female fish in each of the groups, and carrying out a two-factor crossover experiment with different water temperatures and flow velocities on each of the groups in a second annular water tank to obtain relative expression levels of feminization genes and masculinization genes through comprehensive transcriptomics analysis after the two-factor crossover experiment;

(3) dividing a number of fish with synchronized development in an adult stage into a plurality of groups, with equal numbers of male fish and female fish in each of the groups, and carrying out a two-factor crossover experiment with different water temperatures and flow velocities on each of the groups in a third annular water tank to obtain a spawning quantity of each of the groups after the two-factor crossover experiment;

(4) obtaining spawning quantities of fish at different water temperatures and flow velocities during a wild spawning season, as well as water temperatures and flow velocities at a time of spawning;

(5) calculating a hatching rate and a survival rate for each group of fish eggs based on numbers of hatched fish eggs and survived fish eggs of each of the groups, and fitting to obtain a curved surface of two-factor interaction relationship between the water temperature, the flow velocity and the hatching rate, and a curved surface of two-factor interaction relationship between the water temperature, the flow velocity and the survival rate according to the hatching rates and survival rates of the plurality of groups, as well as water temperatures and flow velocities corresponding to working conditions; obtaining a water temperature range and a flow velocity range for a first embryonic stage where the hatching rate reaches a preset range of hatching rate according to the curved surface of two-factor interaction relationship between the water temperature, the flow velocity and the hatching rate; obtaining a water temperature range and a flow velocity range for a second embryonic stage where the hatching rate reaches a preset range of survival rate according to the curved surface of two-factor interaction relationship between the water temperature, the flow velocity and the survival rate; identifying an overlapping part of the water temperature range for the first embryonic stage and the water temperature range for the second embryonic stage as a suitable water temperature range for the embryonic stage, and identifying an overlapping part of the flow velocity range for the first embryonic stage and the flow velocity range for the second embryonic stage as a suitable flow velocity range for the embryonic stage;

(6) calculating a gonadal development level of female fish and a gonadal development level of male fish in each of the groups according to the relative expression levels of feminization genes and masculinization genes of each of the groups, fitting to obtain a curved surface of two-factor interaction relationship between the water temperature, the flow velocity and the gonadal development level of female fish, and a curved surface of two-factor interaction relationship between the water temperature, the flow velocity and the gonadal development level of male fish according to the gonadal development levels and corresponding water temperature and flow velocity; obtaining a water temperature range and a flow velocity range for a first juvenile stage where the gonadal development level of female fish reaches a preset range of developmental level according to the curved surface of two-factor interaction relationship between the water temperature, the flow velocity and the gonadal development level of female fish; obtaining a water temperature range and flow velocity range for a second juvenile stage where the gonadal development level of male fish reaches a preset range of developmental level according to the curved surface of two-factor interaction relationship between the water temperature, the flow velocity and the gonadal development level of male fish; identifying an overlapping part of the water temperature range for the first juvenile stage and the water temperature range for the second juvenile stage as a suitable water temperature range for the juvenile stage, and identifying an overlapping part of the flow velocity range for the first juvenile stage and the flow velocity range for the second juvenile stage as a suitable flow velocity range for the juvenile stage;

(7) obtaining a first dataset according to the spawning quantity of each of the groups and the corresponding water temperature and flow velocity after the two-factor crossover experiment; obtaining a second dataset according to a spawning quantity of wild fish and the corresponding water temperature and flow velocity; standardizing the first dataset and the second dataset, fitting a curved surface of two-factor interaction relationship between the water temperature, the flow velocity and a standardized spawning quantity according to the standardized spawning quantity and the corresponding water temperature and the flow velocity; and obtaining a standardized water temperature range and flow velocity range where the standardized spawning quantity reaches a preset spawning quantity threshold according to the curved surface of two-factor interaction relationship between the water temperature, the flow velocity and the standardized spawning quantity as a suitable water temperature and a suitable flow velocity for the adult stage;

(8) obtaining upper and lower limits of ecological flow ranges for the embryonic, juvenile, and adult stages by multiplying upper and lower limits of the suitable flow velocity ranges for the embryonic, juvenile, and adult stages by a cross-sectional area of a target river, and summarizing the ecological flow ranges for the embryonic, juvenile, and adult stages to obtain the ecological flow process and the water temperature process throughout the life history of fish; and (9) summarizing the suitable water temperature ranges for the embryonic, juvenile, and adult stages to obtain the water temperature process throughout the life history of fish, wherein the first annular water tank is composed of a first straight section, a first curved section, a second straight section, and a second curved section that are connected in sequence, booster pumps are installed on both sides of straight sections, and different flow velocities are achieved by controlling a number of the booster pumps to be turned on; and the first annular water tank is completely placed in a temperature-controlled room, such that different water temperature conditions are achieved.

2. The method according to claim 1, wherein a method to obtain relative expression levels of feminization genes and masculinization genes comprises:

collecting gonadal tissue samples from the fish, performing a transcriptome sequencing on the gonadal tissue samples using a transcriptome sequencing tool to obtain gene sequence data; and taking gene of the group with the working conditions closest to a real environmental state as a control group based on conditions of a false discovery rate (FDR) ≤0.05 and fold change (FC)≥2, determining all differentially expressed feminization genes and masculinization genes, and analyzing relative expression levels of differentially expressed feminization genes and masculinization genes of each of the groups relative to the control group.

3. The method according to claim 1, wherein calculation methods for gonadal development levels of female fish and male fish are as follows:

performing statistics of a number of differentially expressed feminization genes and a number of differentially expressed masculinization genes; and calculating the gonadal development levels of female fish and male fish through the relative expression levels of feminization genes and masculinization genes according to following formulae:

$$\text{Gonadal development level of female fish} = \frac{\sum \text{Relative expression level of feminization genes}}{\text{Number of the differentially expressed feminization genes}} - \frac{\sum \text{Relative expression level of masculinization genes}}{\text{Number of the differentially expressed masculinization genes}}$$

$$\text{Gonadal development level of male fish} = \frac{\sum \text{Relative expression level of masculinization genes}}{\text{Number of the differentially expressed masculinization genes}} - \frac{\sum \text{Relative expression level of feminization genes}}{\text{Number of the differentially expressed feminization genes}}.$$

4. The method according to claim 1, wherein the second annular water tank has a diameter greater than that of the first annular water tank; the second annular water tank is composed of a first straight section, a first curved section, a second straight section, and a second curved section that are connected in sequence; electric propellers are installed on both sides of straight sections, achieving working conditions of different flow velocities through different powers of the electric propellers; and the second annular water tank is covered with a translucent tarpaulin, a plurality of electric heating rods are placed inside the second annular water tank at intervals, and a cooling water circulating industrial chiller is also placed inside the second annular water tank to achieve working conditions of different water temperatures.

5. The method according to claim 1, wherein the third annular water tank has a diameter greater than that of the second annular water tank, the third annular water tank is composed of a first triangular section, a first curved section, a second triangular section, and a second curved section that are connected in sequence; each of the first triangular section and the second triangular section is composed of a base and two hypotenuses located on the base, the base is connected to inner edges of the first curved section and the second curved section, the two hypotenuses are respectively connected to outer edges of the first curved section and second curved section, barrier nets and a plurality of thrusters are arranged in the first triangular section and the second triangular section, a plurality of submersible pumps are arranged inside the barrier nets, and different combinations of thrusters and submersible pumps achieve working conditions of different flow velocities; and a plurality of electric heating tubes are placed at intervals inside each of the first curved section and the second curved section, and a water cooling device is also placed to achieve work conditions of different water temperatures.

6. The method according to claim 1, wherein a setting method of working conditions for the two-factor crossover experiment is as follows:

selecting m water temperature point values at equal intervals from a survivable water temperature range for the fish, and selecting n flow velocity point values at equal intervals from a survivable flow velocity range for the fish; and selecting any point value from the m water temperature point values, selecting any point value from the n flow velocity point values, combining the point value in pair to obtain m×n different combinations, and taking each of the combinations as working conditions for one group of the fish.

7. The method according to claim 1, wherein a sampling method for the wild spawning season is as follows:

sampling fish eggs, a flow velocity, and a water temperature at a target cross section of a target river section during a spawning season continuously at regular intervals until no fish eggs is found;

obtaining a flow velocity and a water temperature at an upstream of the target cross section upon sampling;

identifying a number of fish eggs, an egg density and a embryo development time of fish eggs;

considering a location at a distance L from an upstream direction to the target cross section as a fish spawning site, and L=flow velocity at the target cross section× embryo development time;

obtaining a flow velocity and a water temperature of the fish spawning site according to the flow velocity and water temperature at the upstream of the target cross section during sampling, and taking the same as flow velocity and water temperature of a spawning cross section; and determining a spawning quantity at each moment at the spawning cross section according to an identified number of fish eggs.

8. The method according to claim 1, wherein a method for obtaining the second dataset is as follows:

considering a continuous time period during which spawning behavior occurs for more than 2 consecutive days as a spawning event according to the spawning quantity at each moment at a spawning cross section;

identifying a moment when the spawning quantity of each spawning event increases by a preset percentage over a previous moment as a spawning peak event; and obtaining and identifying a flow velocity and a water temperature at a spawning cross section corresponding to a moment with a maximum egg density of each spawning peak event as the second dataset.

9. The method according to claim 1, wherein the curved surface of two-factor interaction relationship is fitted using Gaussian regression.

* * * * *